(12) United States Patent
Le-Bouedec et al.

(10) Patent No.: US 10,293,924 B2
(45) Date of Patent: May 21, 2019

(54) METHOD AND SYSTEM FOR ASSISTING THE PILOTING OF AN AIRCRAFT IN LANDING PHASE

(71) Applicants: Airbus (S.A.S.), Blagnac (FR); Airbus Operations (S.A.S.), Toulouse (FR)

(72) Inventors: Erwan Le-Bouedec, Toulouse (FR); Rémi Morin, Plaisance du Touch (FR); Jérémie Briere, Toulouse (FR); Mathieu Reguerre, Toulouse (FR); Nicolas Daniel, Toulouse (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 62 days.

(21) Appl. No.: 15/372,039

(22) Filed: Dec. 7, 2016

(65) Prior Publication Data

US 2017/0183086 A1 Jun. 29, 2017

(30) Foreign Application Priority Data

Dec. 11, 2015 (FR) ...................................... 15 62246

(51) Int. Cl.
*B60T 8/17* (2006.01)
*G08G 5/00* (2006.01)
(Continued)

(52) U.S. Cl.
CPC .......... *B64C 25/426* (2013.01); *B60T 8/1703* (2013.01); *G01C 23/00* (2013.01);
(Continued)

(58) Field of Classification Search
CPC ..... B60T 8/1703; G01C 23/00; G01C 23/005; G05D 1/0676; G08G 5/025; G08G 5/0021; G01S 13/913
(Continued)

(56) References Cited

U.S. PATENT DOCUMENTS 6,991,304 B2 1/2006 Villaume
7,014,146 B2 3/2006 Villaume et al.
(Continued)

FOREIGN PATENT DOCUMENTS

EP 2 554 443 A1 2/2013
FR 2 817 979 A1 6/2002
(Continued)

OTHER PUBLICATIONS

French Search Report for Application No. 1562246 dated Sep. 9, 2016.

*Primary Examiner* — Maceeh Anwari
(74) *Attorney, Agent, or Firm* — Jenkins, Wilson, Taylor & Hunt, P.A.

(57) ABSTRACT

The runway state determined on the ground by an aircraft and provided to the aircraft on approach does not make it possible to account for possible degradation of the runway occurring since the previous determination of that runway state. Updating of this runway state on the basis of a simple comparison between a desired deceleration and an observed deceleration resulting from a degraded runway is not satisfactory either. The disclosure herein thus provides for obtaining a local stopping distance according to a local runway state characterizing a runway zone on which the aircraft is in movement at the time of the landing, this local stopping distance being estimated based on local measurements made in the aircraft; obtaining a reference stopping distance according to a reference runway state; then comparing these two distances with each other to determine whether the local runway state is more degraded than the reference runway state.

14 Claims, 3 Drawing Sheets

(51) Int. Cl.
 *G08G 5/02* (2006.01)
 *B64C 25/42* (2006.01)
 *G01C 23/00* (2006.01)
(52) U.S. Cl.
 CPC ......... *G08G 5/0013* (2013.01); *G08G 5/0021* (2013.01); *G08G 5/0091* (2013.01); *G08G 5/025* (2013.01); *G01W 2203/00* (2013.01); *G08G 5/0008* (2013.01)
(58) Field of Classification Search
 USPC .......................................................... 701/16
 See application file for complete search history.

(56) References Cited

U.S. PATENT DOCUMENTS

| | | |
|---|---|---|
| 8,116,989 B2 | 2/2012 | Journade et al. |
| 8,209,072 B2 | 6/2012 | Villaume et al. |
| 8,275,501 B2 | 9/2012 | Villaume |
| 9,230,444 B2 | 1/2016 | Lascombes et al. |
| 9,299,261 B2 | 3/2016 | Jones |
| 2013/0127642 A1 | 5/2013 | Maggiore et al. |
| 2014/0371958 A1* | 12/2014 | Lascombes .............. G08G 5/02 701/16 |

FOREIGN PATENT DOCUMENTS

| | | |
|---|---|---|
| FR | 2 857 468 A1 | 1/2005 |
| FR | 2 914 097 A1 | 9/2008 |
| FR | 2 930 669 A1 | 10/2009 |
| FR | 2 936 077 A1 | 3/2010 |
| FR | 2 978 736 A1 | 2/2013 |
| FR | 3 007 179 A1 | 12/2014 |

* cited by examiner

Figure 4

METHOD AND SYSTEM FOR ASSISTING THE PILOTING OF AN AIRCRAFT IN LANDING PHASE

CROSS-REFERENCE TO RELATED APPLICATION

This application claims the priority, according to Article 35 U.S.C. § 119(a)-(d), of the French Patent Application No. 1562246 filed on Dec. 11, 2015, which is incorporated by reference herein in its entirety.

TECHNICAL FIELD

The present disclosure relates to a method and a system for assisting the piloting of an aircraft, and an aircraft equipped with such a system.

BACKGROUND

In the landing, take-off and, more generally, ground movement phases of an aircraft, knowledge of the state of the runway surface is of paramount importance.

This surface state, or "runway state", has been standardized in a scale of runway states providing a plurality of discrete values: generally, dry runway (DRY), wet/damp runway (WET), soaked runway (WATER), runway with compacted snow (CSNW), snowy runway (SNW), frozen runway (ICE), etc.

Specifically, predicting the braking performance of the aircraft depends on this knowledge. It is thus possible:

- to best estimate the distance required to stop the aircraft during its landing, for the sake of safety;
- not to overestimate this stopping distance required to bring the aircraft to a halt and therefore not to have, unduly, a negative impact on the usage operations of the runway and the aircraft.

Numerous pilot assist systems require precise knowledge of this runway state.

For example, documents FR2817979 and FR2857468 propose devices for assisting piloting in the approach and landing phases, known as "Brake to Vacate" (BTV), allowing the braking of the aircraft to be monitored and controlled via closed-loop control laws. These control laws depend directly on the estimation of stopping distances on the basis of the runway state.

On the other hand, documents FR2936077 and FR2914097 propose devices for assisting piloting in the approach and landing phases, known as "Runway Overrun Protection" (ROP) or "Runway Overrun Warning" (ROW), making it possible to detect a risk of overrunning the runway depending on the runway state, in order to warn the pilot either to execute a go-around or to fully apply the brakes.

However, the braking performance of an aircraft on a runway the to be contaminated, and hence the required stopping distance, is difficult to predict due to the difficulty in having reliable and precise knowledge of the runway state, which is essential to the deceleration of the aircraft.

Traditionally, the runway state is determined by ground crew, or evaluated by a pilot during the landing and delivered in a landing report. This information on the runway state, transmitted to aircraft on approach, is nonetheless rather unreliable and potentially becomes outdated quite quickly. Specifically, runway state characteristics have a high degree of time volatility.

In order to make the estimation of a runway state reliable, documents FR2930669 and FR2978736 propose solutions making it possible to automatically estimate the landing runway state on the basis of measured levels of braking performance of an aircraft during its landing, regardless of the type of aircraft.

However, the runway state thus determined and delivered to aircraft on approach does not allow a potential deterioration in the runway occurring between the two landings to be taken into account.

In order to take this potential deterioration in the runway into account, document FR3007179 envisions determining local information depending on a local runway state characterizing an area of runway on which the aircraft is in movement during the landing. This local information, when it indicates that a local runway state is worse than a reference runway state, is used to update, in real time or near real time, the runway state or a braking datum resulting therefrom.

The updated braking datum may then be delivered as input to a brake assist module, which, in response, generates a braking setpoint for controlling a brake device of the aircraft.

The process of updating the runway state is referred to as a "unidirectional" process since only a downgrading thereof is permitted, without the possibility of upgrading it during the landing. This limitation has been put in place for safety reasons. Specifically, a temporary improvement in the deceleration capabilities of the aircraft due to an upgraded assessment of the runway state should not be banked on, since nothing guarantees that this upgraded state will last until the aircraft comes to a stop.

Figure 1:
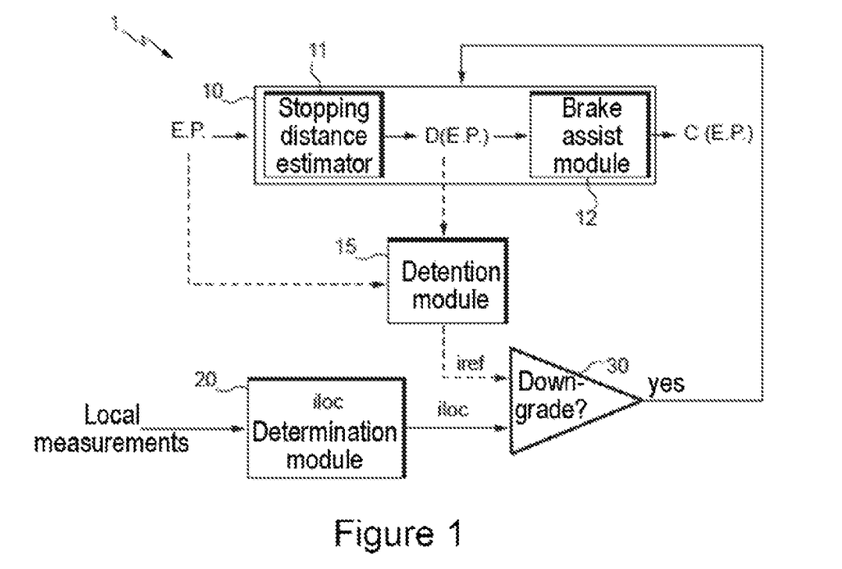
FIG. 1 illustrates a system for assisting the piloting of an aircraft according to the prior art.

FIG. 1, taken from the document FR3007179, illustrates a system for assisting the piloting of an aircraft in landing phase according to this same document. In this system, the determination of whether the local runway state is worse than the reference runway state is carried out by comparing two data of the same nature, $i_{ref}$ and $i_{loc}$. These items of reference and local information are either runway states or current levels of braking or deceleration of the aircraft.

However, a drawback of this system based on braking or deceleration levels is that it applies the same criteria triggering the updating of the runway state or the braking datum throughout landing and movement on the runway.

The present disclosure aims to improve the pilot assist of an aircraft, in particular in the landing phase.

SUMMARY

Specifically, the subject matter herein notes that one and the same difference in deceleration (between that measured and a desired setpoint calculated from the reference runway state) produces substantially different effects on the braking datum on input into the brake assist module, depending on whether the aircraft is just touching down on the runway (high speed of movement) or is at the end of the landing process (low speed of movement).

This is explained by the fact that a given deceleration at high speed substantially decreases the braking distance, while the same deceleration at low speed only marginally decreases the braking distance.

The choice of deceleration difference threshold for triggering the update is then extremely tricky.

On the one hand, it is not desirable for the update to be too easily triggered due to it being a non-reversible process. Specifically, downgrading the runway state may lead to discomfort for the passengers and increase wear on the aircraft, due to higher decelerations being imposed by the brake system in response to this update. For example, it is not necessary to use reverse thrust when the runway state does not justify it. Likewise, if the runway is downgraded to the level ICE, the brake system will execute maximum brake pressure which, on a runway whose runway state is in fact DRY, will result in a very high level of deceleration and a substantial increase in the temperature of the brakes, potentially leading to the tires automatically being deflated in order to avoid their explosion.

On the other hand, it is not desirable to unnecessarily trigger this update due to the discontinuous effects (since the scale of runway states is discontinuous) that it may have. In particular, passing to a lower runway state may instantaneously trigger a battery of acoustic alarms in the cockpit, negatively affecting the quality of communication with the control tower or stressing the crew. It may also have a substantial impact on the runway occupancy time, since very heavy braking due to a downgrade in the runway state level generally leads, even if it is inappropriate, to an extended taxiing time. Specifically, after a high level of deceleration resulting from heavy braking, there is often cause to execute a go-around, while the aircraft is moving at low speed, in order to reach an exit linkway.

It therefore appears useful to improve the decision-making process involved in downgrading runway states.

The disclosure herein bases this on more relevant parameters.

To this end, one particular aim of the disclosure herein is a method for assisting the piloting of an aircraft in landing phase, comprising the following steps carried out by the aircraft:

generating a reference braking datum depending on a reference runway state;

determining local information depending on a local runway state characterizing an area of runway on which the aircraft is in movement during the landing;

when the local information indicates that the local runway state is worse than the reference runway state, updating the reference runway state and generating an updated braking datum depending on the updated runway state; and delivering the reference braking datum followed by the updated datum, if applicable, as input to a brake assist module capable of generating a braking setpoint for controlling a brake device of the aircraft, the method being characterized in that the local information comprises a local stopping distance estimated on the basis of local measurements made in the aircraft, and in that it additionally comprises the following steps:

obtaining a reference stopping distance from the reference braking datum; and comparing the local stopping distance with the reference stopping distance in order to determine whether or not the local runway state is worse than the reference runway state.

Thus, the decision to update the runway state is no longer solely based on a detected difference between a setpoint deceleration (taking the reference runway state into account) and a current deceleration (measured locally) of the aircraft, which had drawbacks as explained above.

Nowadays the process of irreversibly updating the runway state is more relevant and more robust.

This is obtained by comparing stopping distances instead of deceleration values. Specifically, by switching over to stopping distances, the disclosure herein directly integrates the actual effects caused by the detected difference in deceleration into its decision-making process, taking the variable (decreasing) speed of the aircraft on the runway during the landing into account. Stated otherwise, it is now possible to accept larger differences in deceleration at the end of taxiing compared to just after touchdown, as their effect on the braking distance is substantially different.

Braking performance and therefore the safety of the aircraft during the landing are improved as a result.

Correlatively, another aim of this disclosure herein is a system for assisting the piloting of an aircraft in landing phase, the system being on board the aircraft and comprising:

a generation module for generating a reference braking datum depending on a reference runway state;

a determination module for determining local information depending on a local runway state characterizing an area of runway on which the aircraft is in movement during the landing;

an update module for updating the reference runway state when the local information indicates that a local runway state is worse than the reference runway state, the generation module then being configured to generate an updated braking datum depending on the updated runway state; and a brake assist module receiving the reference braking datum as input, followed by the updated datum, if applicable, configured to generate a braking setpoint for controlling a brake device of the aircraft, the system being characterized in that the local information comprises a local stopping distance estimated on the basis of local measurements made in the aircraft, and in that it additionally comprises:

a module for obtaining a reference stopping distance from the reference braking datum; and a comparator for comparing the local stopping distance with the reference stopping distance in order to determine whether or not the local runway state is worse than the reference runway state.

Advantages of the pilot assist system are similar to those of the method according to the disclosure herein. Other features of the pilot assist system and method according to various embodiments are disclosed herein.

In some embodiments, the comparison comprises comparing the difference between the local stopping distance and the reference stopping distance with a predetermined threshold value. It should be noted that this difference may be the simple difference between the two distances mentioned, or, in a variant, a relative difference retranscribing, for example, the percentage variation in the stopping distance, between the reference and the local.

In some particular embodiments, the predetermined threshold value depends on a distance between the aircraft and an end of the runway on which the aircraft is in movement during the landing. This arrangement makes it possible to dynamically adjust the updating process depending on runway overrun risks. A safety margin may of course be taken into account.

In other particular embodiments, the predetermined threshold value depends on the reference runway state. This approach makes it possible to adjust the accepted tolerance to braking uncertainties linked to various weather conditions, which correspond to the various possible runway states.

In other particular embodiments, which may potentially be combined, the predetermined threshold value depends on the reference stopping distance. This makes it possible to compare the simple difference between the two distances mentioned, while ensuring a relative consideration of this difference.

In some embodiments, the determination of whether or not the local runway state is worse than the reference runway state depends on a plurality of local stopping distances estimated for a respective plurality of consecutive instants in time.

Filtering may thus be put in place over an analysis time window. In particular, the latter may be defined such that the plurality of consecutive instants in time covers several seconds, for example 10 seconds, leading, for example, to 80 measurements (for eight measurements per second).

Each local stopping distance at a current time 't' may, in particular, be estimated on the basis of local measurements made in the aircraft for the current instant in time 't', in particular measurements made between 't−1' and 't', for example measurement of the position and speed of the aircraft (GPS) and measurement of instantaneous deceleration.

The possibility of highly temporally transient measurements (for example the aircraft crossing a puddle of water) irreversibly affecting the runway state taken into account for braking is thus avoided.

In particular embodiments, the determination comprises a plurality of comparisons between, respectively, each estimated local stopping distance and a corresponding reference stopping distance estimated on the basis of the reference braking datum for the same instant in time. Specifically, the stopping distance theoretically remaining should be calculated each time (i.e. at each time 't'), taking the reference runway state into account. Thus, the comparison between the distances is shown to be precise.

In other particular embodiments, the determination comprises incrementing a counter when one of the comparisons indicates a difference between the estimated local stopping distance and the obtained reference stopping distance that is above a predetermined threshold value—stated otherwise, when the measured deceleration is worse than that expected—and decrementing the counter when the comparison indicates that the difference is below the predetermined threshold value—stated otherwise, when the measured deceleration is better than that expected.

A counter filtering the differences in stopping distance in an analysis window is thus provided.

According to one particular feature, the value of incrementation or decrementation depends on the difference, and in particular on the relative difference mentioned above. For example, the value of the increment may be X when the increase in the stopping distance represents 10% of the reference stopping distance (stated otherwise, a relative difference of 10%) and its value may be Y<X when the increase in the stopping distance represents 5% of the reference stopping distance.

This results in intelligent filtering that, on the one hand, may highlight substantial differences in stopping distances and, on the other hand, may ignore those that are relatively small.

According to another particular feature, the predetermined threshold value and/or the value of incrementation or decrementation depends on the reference runway state. Again, this configuration makes it possible to take braking uncertainties linked to various weather conditions (which correspond to the various possible runway states) into account when it comes to assessing the impact of a difference between stopping distances.

According to another particular feature, the incrementation or decrementation of the counter is conditional on a minimum speed of the aircraft and/or the presence, for a predefined duration, of a critical braking condition of the aircraft corresponding to an operation of braking the aircraft limited by the friction of the runway or adhesion to the runway. This arrangement makes it possible to avoid unnecessary calculations.

In the first case, this is particularly because, in phases of low speed of movement, for example below 10 knots, in particular when the aircraft stops decelerating on the landing runway or when it is navigating the taxiways, there is little risk of overrunning the runway due to inability to brake. Adjusting the reference runway state is therefore no longer necessary.

In the second case, it is particularly because the full braking capabilities are not being made use of by the aircraft. Additionally, even if the reference runway state does not correspond to the actual runway state, the latter does not prevent an effective landing according to the setpoints (reference braking datum) delivered to the brake assist module.

In particular, it may be envisaged that the critical braking condition is at least one of the following: the difference between a controlled deceleration value of the aircraft and a deceleration value measured by the aircraft exceeds a predetermined threshold; the level of manual depression of a brake pedal by an operator exceeds a predetermined threshold; the difference between a controlled braking level of the aircraft and a braking level measured in the aircraft exceeds a predetermined threshold; an anti-skid system of the aircraft is triggered.

According to another particular feature, the reference runway state is updated when the counter exceeds a threshold value. Hence, the update occurs only if a downgraded runway state is detected (via a longer estimated stopping distance) a sufficient number of times in the analysis window. Consequently, this arrangement ensures that the analysis is filtered in order to remove highly localized events.

In one embodiment, the updating of the reference runway state comprises the downgrading of the reference runway state by one level only on a scale of runway states. Stated otherwise, the runway state is not necessarily directly updated with a local runway state which could be deduced from local measurements in the analysis window. In this instance it is limited to downgrading the reference state by a single grade, before starting over in a new analysis window.

This configuration also engages progressive filtering. Specifically, if only a portion of the runway is in substantially worse condition than the rest of the runway, the downgrade in the runway state resulting from an analysis of this portion remains limited and an analysis of the following portions of the runway does not lead to further downgrading.

According to some embodiments of the disclosure herein, the method additionally comprises the following steps:

obtaining an updated stopping distance from the updated braking datum;

comparing the updated stopping distance with a distance of the aircraft from an end of runway;

and taking action when the updated stopping distance is longer than the distance of the aircraft from the end of the runway, potentially taking a safety margin into account.

This configuration aims to guarantee safety during the landing.

By way of examples, the action taken may comprise at least one action from among the following:

executing a higher level of deceleration of the aircraft; and warning an aircraft crew that a braking distance is too long.

According to other embodiments of the disclosure herein, the method additionally comprises a step of notifying an aircraft crew of the updated runway state. The pilot may thus adapt his or her actions and, in particular, his or her speed in order to choose an exit taxiway and move theretoward.

All or some of the methods according to the disclosure herein may be implemented by computer, combining software and hardware. The disclosure herein may therefore be stored in the form of a computer program product comprising instructions suited to the implementation of each of the steps of the method when the program is executed by a microprocessor.

Another aim of the disclosure herein is an aircraft comprising at least one pilot assist system such as defined above. It is thus suited to implementing the aforementioned pilot assist method.

BRIEF DESCRIPTION OF THE DRAWINGS

Other particularities and advantages of the disclosure herein will become further apparent from the following description, illustrated by the appended drawings, in which.

DETAILED DESCRIPTION

Figure 2:
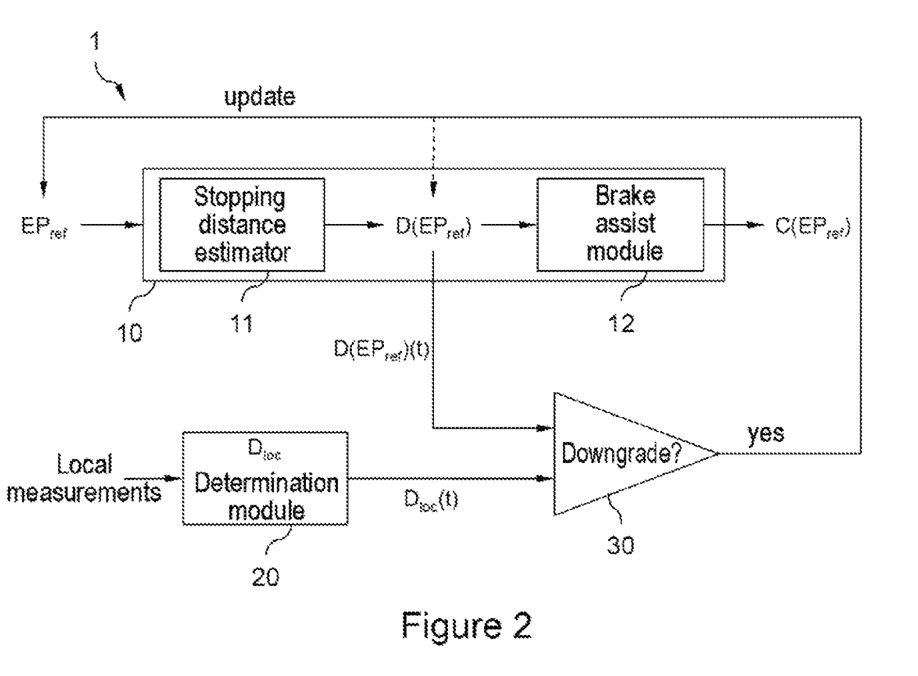
FIG. 2 illustrates a system for assisting the piloting of an aircraft, in accordance with particular embodiments of the disclosure herein.

FIG. 2 schematically represents a system 1 for assisting the piloting of an aircraft, in accordance with particular embodiments of the disclosure herein. This figure is based on FIG. 1 of the prior art.

The system 1 comprises a brake assist system 10 which, based on a reference runway state $EP_{ref}$ received, for example, from an aircraft that has previously landed or from a ground station, generates a braking setpoint $C(EP_{ref})$ delivered as input to a brake device of the aircraft, or generates a warning message $C(EP_{ref})$ delivered as input to a playback device of the aircraft. It should be noted that the warning message may be a non-warning message, on touchdown.

The brake assist system 10 comprises a module 11 for generating a braking datum depending on the reference runway state $EP_{ref}$ and comprises a brake assist module 12 configured to generate the braking setpoint $C(EP_{ref})$ from the braking datum generated. The brake assist module 12 thus calculates, in real time, braking setpoints adapted to the actual landing conditions. These setpoints make it possible, for example, either to aim for the end of the runway (or slightly before depending on a safety margin) in order to protect the aircraft, or to aim for a previously selected point of benefit to the current mission (for example an exit linkway to a taxiway minimizing the runway occupancy time or minimizing the journey toward the boarding gate).

In the example of the figure, the module 11 for generating a braking datum is a stopping distance estimator configured to estimate a predicted stopping distance $D(EP_{ref})$ of the aircraft depending on the reference runway state EP, and potentially on other parameters of the aircraft such as its characteristics (mass, slat/flap configuration, etc.), its performance (deceleration capabilities in a given configuration, braking capabilities, etc.) or else its piloting characteristics (speed of the aircraft, position with respect to the runway threshold, etc.) and local parameters (wind direction, etc.).

The runway state $EP_{ref}$ is generally based on models provided by regulations, for example the scale of states below, in order of increasingly poor state: DRY (for a dry runway), WET (for a wet runway), COMPACTED SNOW (CSNW, for snow packed onto the runway), SNOW (SNW for snow on the runway), WATER or SLUSH (WTS, for runways contaminated by standing water or melted snow), et ICY (for ice).

The brake assist system 10 may, for example, be a device of Brake to Vacate (BTV) type, such as described in the documents FR2817979 et FR2857468 allowing the pilot to control the braking of the aircraft depending on a theoretical stopping distance associated with the reference runway state $EP_{ref}$. This braking setpoint $C(EP_{ref})$ generated by the BTV device thus controls a brake device, for example brakes, air brakes, etc.

This braking setpoint $C(EP_{ref})$ may, for example, represent a brake command imposing a certain deceleration corresponding to the predicted stopping distance $D(EP_{ref})$ for the aircraft.

In a variant, the brake assist system 10 may be a device for warning of and managing the risk of overrunning the runway of Runway Overrun Protection (ROP) type, such as described, for example, in the documents FR2936077 and FR2914097.

The ROP device adjusts the predicted stopping distance output by the stopping distance estimator depending on the input reference runway state and, as a result, if certain conditions are met (for example if the predicted stopping distance brings the aircraft close to the end of the runway or off the end thereof), may transmit warnings and/or braking orders.

These warnings may comprise or consist of visual or acoustic messages displayed or broadcast in the cockpit of the aircraft, for the attention of the crew. A braking order may be an order for maximum automatic braking (full pressure) intended for the brake device.

The system 1 also comprises a determination module 20 for determining local information depending on a runway state local to the aircraft characterizing an area of runway on which the aircraft is in movement during the landing. This determination is, for example, carried out based on measurements referred to as local measurements in the sense that at least one physical quantity of the aircraft is measured during the landing at the moment when the aircraft is moving through the portion of the runway considered to be "local".

For this purpose, the aircraft is equipped with ad hoc sensors, which are located, for example, at each wheel in order to determine, for example, the vertical load applied thereto and/or the brake torque applied by the brake system, or else the rotational speed of the wheels during the landing.

The aircraft may also comprise one or more ADIRS (air data inertial reference system) inertial measurement units allowing measurements of the ground speed of the aircraft, position, acceleration and temperature to be obtained, a flight management system (FMS), an apparatus for estimating physical quantities of the tires (internal pressure and temperature), and a GPS module providing the position of the aircraft.

Another physical quantity that may be measured is the level of depression of brake pedals by the pilot or a brake pressure.

In general, numerous data may be provided and used in order to determine the local information. By way of illustration, the module 20 receives the location of the center of gravity CG of the aircraft, the slope of the runway, the external temperature, wind data (strength and direction), speeds (ground speed, true and calibrated airspeed; wheel speed), altitude data (pressure, etc.) the mass of the aircraft, airport data, data on the runway used, in particular the GPS coordinates of the runway, data on the GPS position of the aircraft, engine operational parameters, brake pedal depression information, control surface states (such as the high-lift devices, the elevator, the air brakes, the ailerons), measurement information relating to the tires (internal pressure and temperature), Boolean information representing, for example, the touchdown of the main landing gear on the runway and the opening of engine thrust reversal ports, etc.

It should be noted that all or some of these data, mainly those pertaining to dynamic data of the aircraft or external conditions for example, may be updated over time, in particular while the aircraft is taxiing: speeds, engine thrust levels, wind, tire pressure and temperature, etc. The measured data may then be time-stamped in order to facilitate the reconciliation of certain measurements with the ground speed of the aircraft at the same instant in time and/or the area of the runway (position of the aircraft) on which the aircraft is in movement at the same instant in time.

These measurements made by the various sensors are transmitted to the determination module 20, which then calculates the local information accordingly.

According to some embodiments of the disclosure herein, the local information comprises or consists of a local stopping distance $D_{loc}$, i.e. current and taking the area in which the aircraft is in movement into account, estimated on the basis of local measurements made in the aircraft.

This local stopping distance may be produced in an iterative manner, for example every 125 ms such as to have eight measurements per second. The local stopping distance estimated at time 't' is denoted by $D_{loc}(t)$.

By way of illustration, the methods and systems of the applications FR2930669 and FR2978736 may be used for the implementation of the determination module 20. These methods and systems evaluate, in particular, the deceleration or braking performance of the aircraft in order to estimate a current runway state.

For example, the balance of forces makes it possible to obtain a braking force $F_b$ of the aircraft via the following formula: $m \cdot a = T \cdot D_{aero} - F_b - D_{cont} - m \cdot g \cdot \sin \gamma$, where m is the mass of the aircraft, a is the acceleration (or deceleration), T is the engine thrust (obtained, for example, via the position of the throttle and engine parameters such as the engine speed), $D_{aero}$ is the aerodynamic drag (obtained, for example, through modelling based on various parameters, for example the angle of incidence, the longitudinal attitude, air brake deployment information), $D_{cont}$ is the drag resulting from a runway contaminant (based, for example, on a runway profile corresponding to the runway state EP) and $\gamma$ is the slope of the runway.

A local stopping distance $D_{loc}(t)$ may be estimated, for time 't', on the basis of this calculated braking force $F_b(t)$ for time 't'.

The system 1 additionally comprises a comparator 30 and a feedback loop from this comparator to a brake assist module 10 and/or a register storing the reference runway state $EP_{ref}$ for the purposes of implementing the disclosure herein.

The comparator 30 makes it possible to compare the local stopping distance $D_{loc}$ with the reference stopping distance $D(EP_{ref})$ in order to determine whether or not the local runway state, denoted by $EP_{loc}$, is worse than the reference runway state $EP_{ref}$. It should be noted that the two data input into the comparator 30 are of the same nature.

In the example of the figure, the reference stopping distance $D(EP_{ref})$ is, in particular, output directly by the stopping distance estimator 11. More generally, this reference stopping distance $D(EP_{ref})$ may be obtained from any braking datum generated by the module 11 based on the reference runway state $EP_{ref}$.

According to the disclosure herein, the aim of the comparison by the comparator 30 is therefore to determine a potential downgrade in the local runway state with respect to the reference runway state, while being based on the estimated stopping distances instead of on differences in deceleration. The detection of a change of runway state is therefore shown to be more relevant and more robust. This is particularly due to the fact that this approach takes the speed of the aircraft into account, whereas that based on simple differences in deceleration does not retranscribe the actual effect of these differences on the braking process of the aircraft.

The comparison 30 may, in particular, simply compare the difference between the local stopping distance and the reference stopping distance with a predetermined threshold value. The latter is preferably dependent on a distance between the aircraft and an end of the runway on which the aircraft is in movement during the landing in order to detect a situation in which increasing the stopping distance due to a downgrade in the runway state leads to a risk of overrunning the runway. The threshold value may also be dependent on the reference runway state. This makes it possible to assess this risk of overrunning the runway while taking the braking uncertainties which may result from poor runway conditions into account.

In one embodiment, the predetermined threshold value depends on the reference stopping distance. This embodiment thus makes it possible to evaluate a relative difference in distance.

Although the comparison for determining whether or not the local runway state $EP_{loc}$ is worse than the reference runway state $EP_{ref}$ may be based on a single estimation of a local stopping distance $D_{loc}$, preferred embodiments of the disclosure herein envisage that the comparison is dependent on a plurality of local stopping distances $D_{loc}(t)$ estimated for a respective plurality of consecutive instants in time, for example 80 measurements corresponding to 10 s of analysis. Correspondingly, a plurality of reference stopping distances $D(EP_{ref})(t)$ is considered, each corresponding to an estimation of the predicted stopping distance of the aircraft taking its configuration at time 't' into account. For this purpose, the module 11 may produce, on the basis of the reference runway state $EP_{ref}$, a braking datum that takes the form of a function representing the predicted stopping distance $D(EP_{ref})$ over time. For example, $D(EP_{ref}) = -V^2/(2*JX)$, where V is the speed of the aircraft and JX is the longitudinal acceleration (hence negative for a deceleration) estimated at the adhesion limit taking $EP_{ref}$ into account. Additionally, $D(EP_{ref})(t) = -V(t)^2/(2*JX(t))$, where JX may potentially be constant over time.

This approach may resemble filtering or averaging the estimations over an analysis time window in order to increase the robustness of the process of updating the runway states. Specifically, taking a larger or smaller number of estimations of $D_{loc}(t)$ into account according to filtering makes it possible to mitigate the transient effects of a highly isolated or one-off deterioration (for example a puddle or a sheet of black ice). Without this filtering, a single estimation carried out at this one-off deterioration—which is not representative of the overall runway—would lead to delivering an unrepresentative changed runway state to the brake assist system 10. Possible consequences are discomfort for the passengers if the aircraft has to execute a go-around and increased use of (and hence wear on) components (for example brakes, engines) of the aircraft.

When the result of the comparison shows that the runway state has not worsened since the preceding landing (the reference runway state), the brake assist system 10 possesses data (reference runway state $EP_{ref}$ and predicted stopping distance $D(EP_{ref})$) which guarantee effective braking. Thus, none of these data of the system 10 is updated, such that the warning or braking setpoint $C(EP_{ref})$ initially generated by the brake assist system 10 on the basis of the reference runway state is retained.

Conversely, when the result of the comparison shows that the runway state has worsened (i.e. when the local information indicates a local runway state that is worse than the reference runway state), the data of the brake assist system 10 are de facto outdated and no longer guarantee safe braking of the aircraft. The disclosure herein then envisages that the reference runway state $EP_{ref}$ is updated, in order to adapt the braking of the landing to the actual runway conditions in real time. Specifically, the updated runway state $EP_{maj}$ now represents a new reference runway state (by virtue of the feedback loop shown in the figure, the former reference runway state may be overwritten in the memory) from which it is possible to generate another updated braking datum $D(EP_{maj})$ and to deliver it as input to the brake assist module 12, in order to update the warning or braking setpoint $C(EP_{maj})$ in addition.

Preferably, the updating of the reference runway state $EP_{ref}$ comprises the downgrading of the reference runway state by one level only on a scale of runway states, and not a downgrade to the local runway state $EP_{loc}$ if the latter is too poor with respect to the reference runway state $EP_{ref}$. Stated otherwise, the updating process downgrades the runway state only by one grade on the scale of states in question.

An alternative to overwriting the $EP_{ref}$ value in the memory may comprise or consist of directly providing the brake assist system 10 with the $EP_{maj}$ value, the system taking $EP_{ref}$ into account when no modified $EP_{loc}$ state is provided, and taking $EP_{loc}$ into account when the latter is provided.

Thus, the pilot assist system according to the disclosure herein comprises:

a generation module 11 for generating a braking datum $D(EP_{ref})$ depending on a reference runway state ($EP_{ref}$);

a determination module 20 for determining local information depending on a runway state ($EP_{loc}$) local to the aircraft during the landing, i.e. a local runway state characterizing an area of runway on which the aircraft is in movement during the landing, the local information comprising a local stopping distance $D_{loc}$ estimated on the basis of local measurements made in the aircraft. Preferably, multiple estimations $D_{loc}(t)$ are produced at multiple consecutive instants in time 't';

an update module (10, 30) for updating the reference runway state $EP_{ref}$ depending on the determined local information when a local information indicates a local runway state $EP_{loc}$ that is worse than the reference runway state $EP_{ref}$, the generation module then being configured to generate an updated braking datum $D(EP_{maj})$ depending on the updated runway state; and a brake assist module 12 receiving the reference braking datum $D(EP_{ref})$ as input, followed by the updated datum $D(EP_{maj})$, if applicable, configured to generate a braking setpoint $C(EP)$ for controlling a brake device of the aircraft.

Such a pilot assist system may be embedded within a single computer, or else, in a variant, its various functions may be distributed between multiple computers communicating with one another in order, for example, to reuse existing computers.

The new runway state obtained is then used to adjust the braking of the aircraft. Warnings may also be brought up, if applicable.

In one embodiment of the disclosure herein, the aircraft crew is notified of the new runway state or of any information relating to a downgrade in the runway state. They may then, in full knowledge of the cause, adapt their actions, and, in particular, adapt their speed for the exit linkway phase.

An automated decision-making process may also be implemented. Thus, in some embodiments, once the runway state has been updated, an updated stopping distance is obtained from the updated braking datum (arising from the module 11 from the updated runway state), then this updated stopping distance is compared to a distance of the aircraft from an end of runway in order to determine whether there is a risk of overrunning the runway. The position of the aircraft may, in particular, be obtained either directly by GPS, or in a hybrid manner using multiple items of different information in order to decrease the probability of errors, for example GPS combined with the integration of a speed vector obtained from wheel rotation sensors and/or the double integration of an acceleration vector obtained using an inertial measurement unit.

Lastly, an action is taken when the updated stopping distance is longer than the distance of the aircraft from the end of the runway, potentially taking a safety margin into account. By way of example, such an action may be either or both of the following actions:

executing a higher level of deceleration of the aircraft, for example by acting on the hydraulic pressure of the brakes or on the thrust reversers, etc.; and warning an aircraft crew that a braking distance is too long, for example via visual or acoustic signal. In this case, the crew has a set of deceleration mechanisms in order to adjust the landing, or may execute a go-around in the event of a risk of overrunning the runway.

Figure 3:
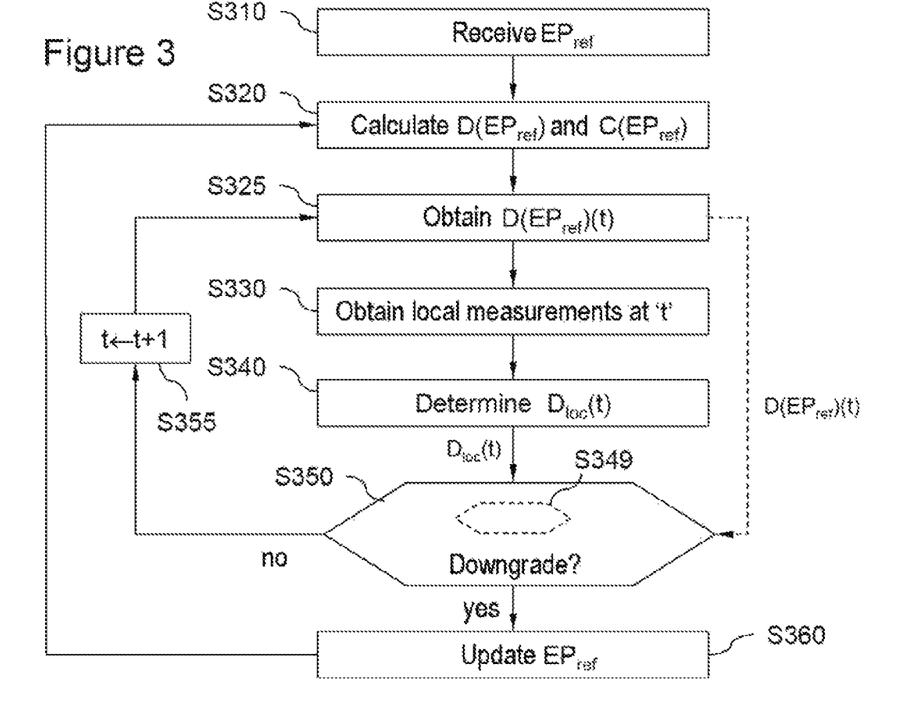
FIG. 3 shows, in the form of a flowchart, the main steps of a method for assisting the piloting of an aircraft according to embodiments of the disclosure herein.

FIG. 3 shows, in the form of a flowchart, the main steps of a pilot assist method according to one particular embodiment of the disclosure herein. This method may be implemented in a pilot assist system according to the disclosure herein, such as, for example, described with reference to FIG. 2.

In a step S310, a theoretical or reference runway state $EP_{ref}$ is received by the aircraft, for example from an aircraft that has previously landed or from a ground station.

For example, this reference runway state $EP_{ref}$ may be the result of a synthesis of multiple runway states obtained during the previously landings of multiple aircraft, this synthesis being produced by the aforementioned ground station.

Next, in a step S320, the brake assist system 10 generates a braking setpoint or a warning message $C(EP_{ref})$ depending on this reference runway state $EP_{ref}$. This step comprises the estimation of a braking datum, for example from a function representing the predicted stopping distance $D(EP_{ref})$ over time, by the estimator 11 as mentioned above.

The braking setpoint $C(EP_{ref})$ may be of a different nature. It may be, in particular, applying a certain braking force value, a level of brake pedal depression, a level of deceleration to be reached, a stopping distance to be reached or else a brake pressure. For example, the level of deceleration to be reached may be calculated as a level of deceleration that is operationally acceptable for the aircraft, taking the reference runway state EP into account. In a variant, it may be the level of deceleration reached by the aircraft under critical braking conditions.

The same applies to the stopping distance to be reached: an operationally acceptable stopping distance or, in a variant, a minimum stopping distance possible for the aircraft under critical braking conditions. Like the aircraft in front on the runway, this considered stopping distance decreases over time, according to a function based on the speed and the deceleration of the aircraft.

The braking conditions are the to be critical when the aircraft reaches a level of braking limited by the friction of the runway or adhesion to the runway.

The warning message may be a voice or visual message for the attention of the pilot, who provides braking setpoints to be applied.

In step S325, the predicted stopping distance $D(EP_{ref})(t)$ for the current instant in time is obtained, for example, from the function mentioned above or from a braking datum generated by the module 11. The first instant in time considered in the algorithm may be that in which the landing gear touches down on the runway for the first time, since it is from this moment that local measurements (step S330 below) may be made in order to determine a local runway state.

This predicted stopping distance $D(EP_{ref})(t)$ is delivered as input to the comparator 30.

Local measurements are made in a step S330 in order to determine (step S340) local information dependent on the local runway state $EP_{loc}$, in particular an estimated local stopping distance $D_{loc}(t)$, for the current instant in time 't'.

This local information may, for example, be derived from a current level of deceleration F', itself obtained directly from an accelerometer. Furthermore, a local runway state may be obtained through the implementation of the mechanisms of the aforementioned documents FR2930669 and FR2978736, on the basis of which the distance $D_{loc}(t)$ may be estimated.

The method moves on to step S350 in which a test comprises or consists of comparing the local information $D_{loc}(t)$ estimated in step S340 with the reference information $D(EP_{ref})(t)$ of the same nature obtained in step S325. The comparison may simply compare a difference between these two values with a threshold value as explained above.

When the threshold value depends on the predicted stopping distance $D(EP_{ref})(t)$, a relative difference is thus evaluated.

A more complex filtering mechanism is illustrated below in conjunction with FIG. 4, which represents one embodiment of step S350.

The objective of the test S350 is to determine whether a local runway state is worse than the reference runway state.

It may be seen that by comparing $D_{loc}(t)$ and $D(EP_{ref})(t)$, the method according to the disclosure herein may detect one and the same downgrade in the runway state when touching down on the runway or at the end of landing on the runway, without being based on an identical deceleration differential (between that measured and that of the setpoint). Specifically, a larger deceleration differential is accepted at the end of landing before downgrading the runway state.

It should be noted that the execution of the test S350 may be conditional on determining (S349) whether the aircraft encounters a critical braking condition.

For example, the level of critical braking or deceleration F (for example the deceleration theoretically attainable at the runway adhesion limit), such as obtained in step S325, is representative of an extremum level of braking to be reached (maximum deceleration, minimum stopping distance, etc.), i.e. obtained under critical braking conditions of the aircraft. In the absence of critical braking conditions, the aircraft possesses additional braking capabilities which remain voluntarily unused. This is because the requested braking is amply sufficient for executing a landing without risk. There is therefore no reason to determine and deal with a potential downgrade in the runway state. Thus, with the test S349, it is possible to do away with unnecessary calculations.

By way of example, the critical braking conditions resulting from braking limited by the friction of the runway are encountered when the difference between a controlled deceleration value of the aircraft and a deceleration value measured by the aircraft exceeds a predetermined threshold; the level of manual depression of a brake pedal by an operator (pilot for example) exceeds a predetermined threshold; the difference between a controlled braking level of the aircraft and a braking level measured in the aircraft exceeds a predetermined threshold; or else an anti-skid system of the aircraft is triggered.

Another example in which the condition S349 is implemented is that implementing the mechanisms of the aforementioned publication FR2930669 when determining a local runway state during the estimation of $D_{loc}(t)$ in step S340, since this determination is carried out only in the presence of critical braking conditions of the aircraft.

It should be noted that as the distance $D(EP_{ref})(t)$ is used only in step S350, step S325 may be carried out at any time in the method between steps S310 and S350, independently of steps S330, S340 and S349, in particular. For example, step S325 may be carried out subsequent to verifying the condition S349 in order to avoid unnecessarily calculating theoretically attainable deceleration.

When the test S350 shows that the runway state is not worse, the method moves on to step S355 in order to consider the next instant in time, then loops back to the above steps in order to obtain the dynamic data dependent on 't', i.e. looping back to step S325 in the example of the figure. In this instance, the data used by the system 10, in particular the reference runway state (and hence the braking setpoint or the warning $C(EP_{ref})$) are not updated. The aircraft thus retains the same braking setpoint or warning since the runway is not in a worse condition.

When the one or more comparisons of the test S350 show that the runway state has worsened with respect to the reference runway state, the reference runway state $EP_{ref}$ is updated in a step S360 in order to take the downgrade in the runway that has occurred since the preceding landing into account and thus establish a satisfactory level of braking safety for the landing. The updated runway state $EP_{maj}$ may take the value of the local runway state $EP_{loc}$ which results from the measurements made in step S330. However, in one preferred variant, the reference runway state $EP_{ref}$ is downgraded by a single level: $EP_{maj}=EP_{ref}-1$.

In order to allow the new runway state to be taken into account, the latter is memorized in the $EP_{ref}$ variable used by the module 11: $EP_{ref} \leftarrow EP_{maj}$.

Next, the method loops back to step S320 in order to generate a new braking setpoint or a warning message $C(EP_{ref})=C(EP_{maj})$ from the new runway state obtained during the update S360.

This looping back allows real-time, or near real-time, and dynamic updating of the setpoint or the warning during the landing.

Figure 4:
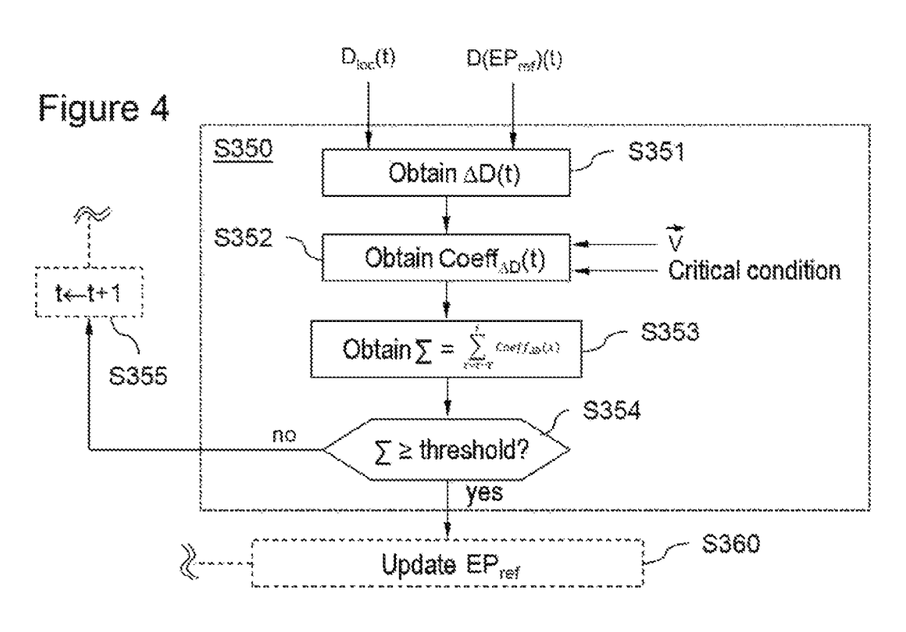
FIG. 4 shows, in the form of a flowchart, steps in carrying out a step of determining a runway state downgrade implemented in the method of FIG. 3, according to embodiments of the disclosure herein.

FIG. 4 shows, with the aid of a flowchart, steps in carrying out step S350 of FIG. 3, according to particular embodiments of the disclosure herein.

This embodiment resembles filtering the measurements over time, in particular because the determination of whether or not the local runway state is worse than the reference runway state depends on a plurality of local stopping distances estimated for a respective plurality of consecutive instants in time.

By virtue of the loop resulting from the test S354 described below and going through step S355 in order to consider a next measurement time, carrying out FIG. 4 makes it possible to integrate multiple past measurements made at times between 't–T' and the current instant in time 't' (for example T=10 s, allowing a maximum of 80 measurements to be taken into account) and to make a decision at time t.

As will be described below, a decision to downgrade the runway state will potentially be taken through the summation of (positive or negative) quantitative coefficients or indicators determined for each of the instants in time that are considered and comparing with a threshold value.

Such an averaging or filtering makes it possible to ignore transient fluctuations in the local measurements of the runway state.

In details of one embodiment, step S350 receives, as input, the two distances $D_{loc}(t)$ and $D(EP_{ref})(t)$ for the current instant in time In step S351, the two distances are compared, for example by calculating a difference $\Delta D(t)$.

By way of example, $D(EP_{ref})(t)=-V(t)^2/(2*JX)$ as mentioned above, and $D_{loc}(t)=-V(t)^2/(2*9.81*AX(t))$, where $AX(t)$ is the longitudinal acceleration of the aircraft measured at the current instant in time 't'.

In one embodiment, the difference $\delta D$ between the two distances is calculated first: $\delta D(t)=D_{loc}(t)-D(EP_{ref})(t)$.

In a variant, a relative difference $\Delta D$ is calculated, for example as a ratio of extension or reduction of the estimated stopping distance:

$$\Delta D(t)=100*\delta D(t)/D(EP_{ref})(t)=100*(D_{loc}(t)-D(EP_{ref})(t))/D(EP_{ref})(t).$$

This relative difference makes it possible, for example, to express the percentage increase in the stopping distance in a simple manner, between that predicted and that determined locally.

Throughout the remainder reference will mainly be made to the relative difference $\Delta D$, although the difference $\delta D$ may also be used with slight adjustments to the calculations.

Taking the loop by steps S354 and S355 into account, the determination of whether or not the local runway state is worse than the reference runway state comprises a plurality of comparisons between, respectively, each estimated local stopping distance $D_{loc}(t)$ and a corresponding reference stopping distance $D(EP_{ref})(t)$ estimated on the basis of the reference braking datum for the same instant in time.

Subsequent to step S351, step S352 comprises or consists of determining a quantitative coefficient or indicator, denoted by $Coeff_{\Delta D}(t)$, for $\Delta D(t)$.

The table below illustrates an exemplary lookup table associating, in a discrete manner, a coefficient $Coeff_{\Delta D}$ with a given difference $\Delta D$. It may be seen that this association comprises or consists of comparing $\Delta D$ with one or more threshold values defined in the first column.

| ΔD | $Coeff_{\Delta D}$ | | | | | |
|---|---|---|---|---|---|---|
|  | ICE | WTS | SNW | CSNW | WET | DRY |
| <−6.0 | −1.1 | −1.1 | −1.1 | −1.1 | −1.1 | −1.1 |
| −6.0 | −0.3 | −0.3 | −0.3 | −0.3 | −0.4 | −0.4 |
| 0.0 | −0.1 | −0.1 | −0.1 | −0.1 | −0.1 | 0 |
| 3.0 | 0 | 0 | 0 | 0 | 0 | 0.1 |
| 6.0 | 0.2 | 0.2 | 0.2 | 0.2 | 0.2 | 0.3 |
| 13.0 | 0.6 | 0.6 | 0.4 | 0.8 | 0.4 | 0.6 |
| 16.0 | 1 | 1 | 0.7 | 1 | 0.7 | 1 |
| 25.0 | 1.5 | 1.5 | 1.2 | 1.3 | 1.2 | 1.3 |
| >28.0 | 1.6 | 1.6 | 1.4 | 1.4 | 1.6 | 1.4 |

In this implementation, the value of the coefficient depends, on the one hand, on the relative difference $\Delta D$ and on the other hand, on the reference runway state. Of course, either one of the criteria may be used alone.

Specifically, on a dry runway ($EP_{ref}$=DRY), $Coeff_{\Delta D}(t)$ =0.1 if $\Delta D(t) \in [3; 6]$, while $Coeff_{\Delta D}(t)=1$ if $\Delta D(t) \in [16; 25]$.

Likewise, if $\Delta D(t)=15$, $Coeff_{\Delta D}(t)=0.4$ when the runway is wet ($EP_{ref}$=WET), while $Coeff_{\Delta D}(t)=0.6$ in the case of a dry runway.

It should be noted that as an alternative to using the relative difference $\Delta D$, the distance $\delta D$ may be used. In this case, the threshold values of the first column of the table above may be adjusted, in particular in order to take the predicted stopping distance into account. In the example above, the threshold values of the table may be multiplied by $100*D(EP_{ref})(t)$ when comparing the difference $\delta D(t)$.

According to one embodiment, assigning a coefficient $Coeff_{\Delta D}(t)$ to the calculated difference $\Delta D(t)$ is conditional on a minimum speed of the aircraft and/or the presence, for a predefined duration, of a critical braking condition of the aircraft corresponding to an operation of braking the aircraft limited by the friction of the runway or adhesion to the runway.

For example, the table above is used to determine $Coeff_{\Delta D}(t)$ when the speed V of the aircraft is higher than a threshold speed, 10 knots for example. When the speed V is lower than this threshold speed (the aircraft is at the end of landing or taxiing along the taxiways), the coefficient $Coeff_{\Delta D}(t)$ is directly set to 0. Unnecessary processing is therefore avoided.

Likewise, it may be considered that the determination of whether or not the local runway state is worse than the reference runway state is advantageous only if the aircraft is under critical braking conditions, i.e. at the adhesion limit taking the local runway state into account. This has already been mentioned above in conjunction with step S349.

Additionally, a critical braking register may be envisaged (set to 0 at the start of FIG. 3), which register is incremented in this step S352 if the aircraft is under critical braking at the current instant in time 't'. Taking the loop by steps S354 and S355 into account, the value of the register may gradually increase and exceed a predefined threshold value, for example 8.

Each time the aircraft is not under critical braking at the current instant in time the register may be reset to 0. Thus, the register is representative of an enduring critical braking situation.

As mentioned above, assigning a coefficient $Coeff_{AD}(t)$ to the calculated difference $\Delta D(t)$ may then be conditional on the value of this register, and use the table above only when the register exceeds the predefined threshold value. Otherwise, the coefficient $Coeff_{AD}(t)$ is directly set to 0, avoiding unnecessary processing.

Subsequent to step S352, step S353 makes provision for evaluating an average level of downgrade of the runway state over the analysis window [t−T; T].

To this end, step S353 calculates the sum of the coefficients $Coeff_{AD}(t)$ determined for each of the instants in time in this analysis window, starting from a last reset.

Taking the above table into account, this calculation comprises incrementing a counter Σ when one of the comparisons S351 indicates a difference between the estimated local stopping distance and the obtained reference stopping distance that is above a predetermined threshold value (around 3 in the table)—stated otherwise, when the measured deceleration is worse than that expected—and decrementing the counter when the comparison indicates that the difference is below the predetermined threshold value—stated otherwise, when the measured deceleration is better than that expected.

A simple implementation of step S353 comprises or consists of adding $Coeff_{AD}(t)$ to the current value of the counter Σ, and subtracting $Coeff_{AD}(t-T-\varepsilon)$ therefrom, where ε is the interval between two measurements, if Σ has not been reset in the meantime (stated otherwise, if Σ did indeed include $Coeff_{AD}(t-T-\varepsilon)$).

Next, in step S354, it is determined whether the counter Σ, representing the average level of downgrade in the runway state over the analysis window, indicates a substantial downgrade in the runway state in comparison to $EP_{ref}$.

To this end, Σ is compared with a threshold value, for example 40, taking the coefficients of the above table into account.

It should be noted that the threshold value may be reached even before the entirety of the analysis window has been taken into account (for example 40 measurements may be sufficient in event of a substantial downgrade, i.e. $\Delta D > 25$).

As long as the threshold has not been reached, the next instant in time is considered by looping back to step S355.

As soon as the threshold is reached, meaning that the local runway state is clearly worse with respect to the reference runway state, the reference runway state is updated in step S360 already described.

Additionally, in this step, the counter Σ is reset to 0 in order to start a new analysis window.

Figure 5:
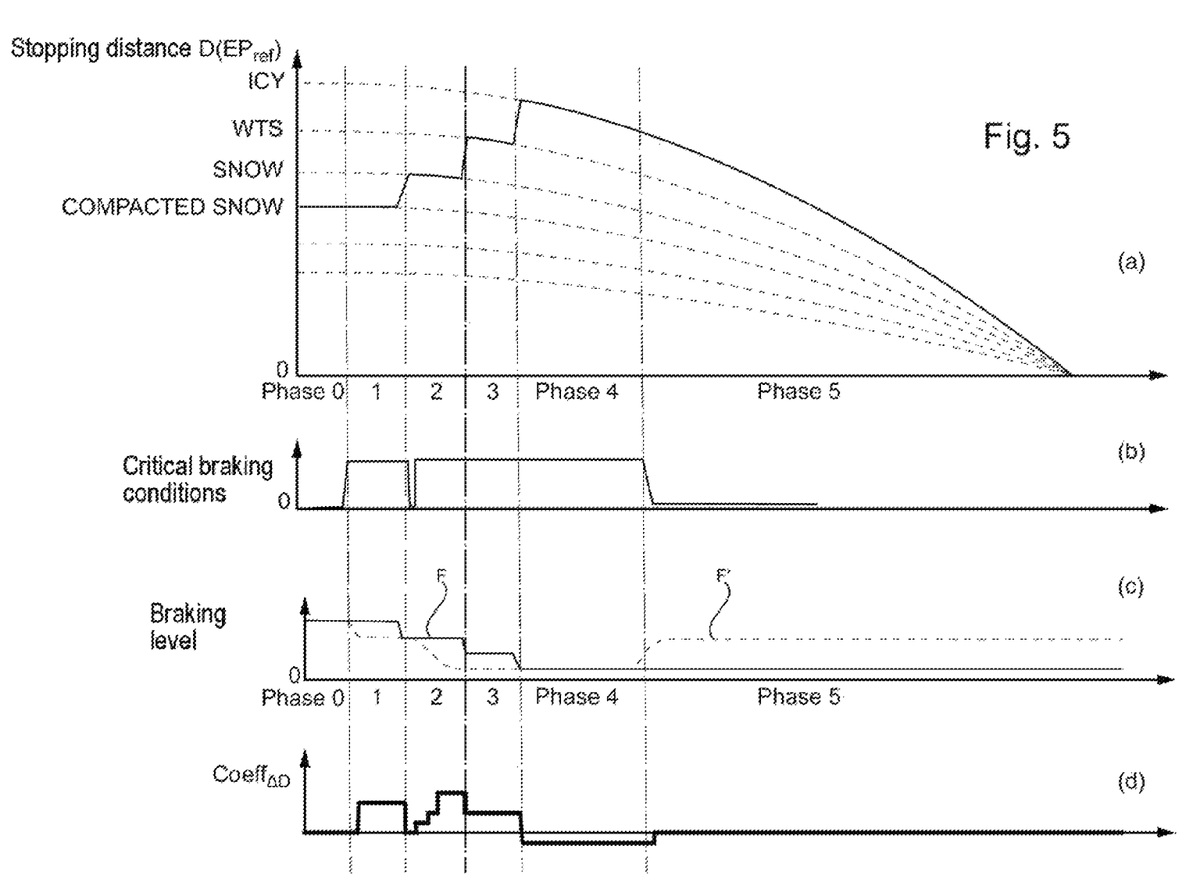
FIG. 5 illustrates an operational scenario of a landing in which the disclosure herein is used.

FIG. 5 is a graphical illustration of the variation in the stopping distance and of the braking level in an operational scenario of a landing in which the disclosure herein is used. This scenario may, in particular, implement the embodiment of FIGS. 3 and 4, in which the pilot assist method is based on a plurality of comparisons between predicted stopping distances and those estimated from current measurements.

In this scenario, an aircraft equipped with a pilot assist system according to the disclosure herein, such as, for example, that described with reference to FIG. 1, is approaching a runway that is theoretically covered in snow ($EP_{ref}$=COMPACTED SNOW).

The brake assist system 10 takes this runway state EP into account and calculates a brake setpoint or warning $C(EP_{ref}$=COMPACTED SNOW) implemented by a brake or playback device once on the ground in phase 1. This brake setpoint or warning is based on a stopping distance $D(EP_{ref}$=COMPACTED SNOW).

In phase 0, the local runway state turns out to be compacted snow, the aircraft managing to brake at the requested setpoint (F=F'—see (c)). As the aircraft is not under critical braking conditions (see (b)), the values of the coefficients $Coeff_{AD}(t)$ are all zero (see (d)). The counter Σ therefore remains at zero, and no change in runway state is effected (test S354 negative).

In phase 1, the aircraft having progressed along the runway, the local runway state appears worse than the reference runway state $EP_{ref}$. Specifically, the aircraft does not brake enough (F') with respect to the setpoint (F): the aircraft is under critical braking conditions. The estimated distances $D_{loc}(t)$ are therefore longer than the predicted distances $D(EP_{ref})(t)$. In this phase, and after the critical braking condition has lasted for a few instants in time (for example eight instants), the value of each $Coeff_{AD}(t)$ is positive in the example of the table above, gradually incrementing the counter Σ. When this reaches the threshold value (test S354 positive at the end of phase 1), the runway state is updated to the next runway state $EP_{maj}$=SNOW (see (a)).

The aircraft begins phase 2 without critical braking ($Coeff_{AD}$=0). Then the runway rapidly deteriorates anew, the aircraft applying critical braking (see (b)), the effect of which, after several instants in time (eight for example), is to add positive $Coeff_{AD}(t)$ coefficients (see (d)). As the deterioration in the runway is gradual (see the gradual curve F'), the coefficients gradually increase by tiers (only three tiers are shown in the figure, while in the example of the table above, up to six tiers may appear according to the arc of the curve F' and according to the final amplitude AD). The coefficients $Coeff_{AD}(t)$ take a high value since the deterioration in the runway is substantial ($EP_{loc}$=ICY for example).

The counter Σ therefore increases gradually and when it reaches the threshold value (test S354 positive at the end of phase 2), the runway state is updated to the next runway state $EP_{maj}$=WTS (see (a)).

This new runway state is not representative of the local runway state. It is for this reason that the aircraft does not leave the critical braking state at the start of phase 3 (see (b)). The level of braking is still insufficient ($D_{loc}(t)$>D $(EP_{ref})(t)$), the coefficients $Coeff_{AD}(t)$ take a lower positive value with respect to phase 2.

The counter Σ therefore increases gradually and when it reaches the threshold value (test S354 positive at the end of phase 3), the runway state is updated to the next runway state $EP_{maj}$=ICY (see (a)).

In phase 4, the aircraft remains under critical, but sufficient, braking conditions (F=F' and hence $D_{loc}(t)$ is substantially equal to $D(EP_{ref})(t)$). The coefficients $Coeff_{AD}(t)$ take a slightly negative value in the example of the table above. As the counter Σ does not reach the threshold value, no change occurs.

Phase 5 then illustrates the case of an improvement in the conditions of the runway. The aircraft leaves the critical braking conditions (see (b) since F'>F) and the coefficients $Coeff_{AD}(t)$ are then all zero.

The preceding examples are only some embodiments of the disclosure herein, which is not limited thereto.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting piloting of an aircraft in landing phase, comprising steps carried out by one or more processors of an aircraft landing assist system onboard the aircraft, the method comprising:
   generating a reference braking datum depending on a reference runway state;
   determining local information depending on a local runway state characterizing an area of runway on which the aircraft is in movement during landing;
   when the local information indicates that the local runway state is worse than the reference runway state, updating the reference runway state and generating an updated braking datum depending on the updated runway state; and
   delivering the reference braking datum followed by the updated datum, if applicable, as input to a brake assist module configured to generate a braking setpoint for controlling a brake device of the aircraft,
   wherein the local information comprises a local stopping distance estimated on a basis of local measurements made in the aircraft;
   obtaining a reference stopping distance from the reference braking datum; and
   comparing a relative distance between the local stopping distance and the reference stopping distance with a predetermined threshold value, to determine whether or not the local runway state is worse than the reference runway state,
   wherein the aircraft landing assist system is in electronic communication with and configured to control the brake device of the aircraft.

2. The method according to claim 1, in which the predetermined threshold value depends on a distance between the aircraft and an end of the runway on which the aircraft is in movement during the landing.

3. The method according to claim 1, in which the predetermined threshold value depends on the reference runway state.

4. The method according to claim 1, in which determination of whether or not the local runway state is worse than the reference runway state depends on a plurality of local stopping distances estimated for a respective plurality of consecutive instants in time.

5. The method according to claim 4, in which the determination comprises a plurality of comparisons between, respectively, each estimated local stopping distance and a corresponding reference stopping distance estimated on the basis of the reference braking datum for the same instant in time.

6. The method according to claim 5, in which the determination comprises incrementing a counter when one of the comparisons indicates a difference between the estimated local stopping distance and the obtained reference stopping distance that is above a predetermined threshold value, and decrementing the counter when the comparison indicates that the difference is below the predetermined threshold value.

7. The method according to claim 6, in which a value of incrementation or decrementation depends on the difference.

8. The method according to claim 6, in which the predetermined threshold value and/or the value of incrementation or decrementation depends on the reference runway state.

9. The method according to claim 6, in which the incrementation or decrementation of the counter is conditional on a minimum speed of the aircraft and/or the presence, for a predefined duration, of a critical braking condition of the aircraft corresponding to an operation of braking the aircraft limited by the friction of the runway or adhesion to the runway.

10. The method according to claim 9, in which the critical braking condition is at least one of the following: the difference between a controlled deceleration value of the aircraft and a deceleration value measured by the aircraft exceeds a predetermined threshold; the level of manual depression of a brake pedal by an operator exceeds a predetermined threshold; the difference between a controlled braking level of the aircraft and a braking level measured in the aircraft exceeds a predetermined threshold; an anti-skid system of the aircraft is triggered.

11. The method according to claim 6, in which the reference runway state is updated when the counter exceeds a threshold value.

12. The method according to claim 11, in which the updating of the reference runway state comprises downgrading of the reference runway state by one level only on a scale of runway states.

13. A system to assist piloting of an aircraft in landing phase, the system being on board the aircraft and the system comprising:
   one or more processors and a non-transitory computer readable medium comprising executable instructions, wherein the executable instructions comprise:
   a generation module configured to generate a reference braking datum depending on a reference runway state;
   a determination module configured to determine local information depending on a local runway state characterizing an area of runway on which the aircraft is in movement during landing;
   an update module configured to update the reference runway state when the local information indicates that a local runway state is worse than the reference runway state, the generation module being further configured to generate an updated braking datum depending on the updated runway state; and a brake assist module configured to receive the reference braking datum as input, followed by the updated datum, if applicable, configured to generate a braking setpoint for controlling a brake device of the aircraft, wherein the local information comprises a local stopping distance estimated on the basis of local measurements made in the aircraft, and a obtaining module configured to obtain a reference stopping distance from the reference braking datum; and a comparator configured to compare a relative difference between the local stopping distance and the reference stopping distance with a predetermined threshold value, in order to determine whether or not the local runway state is worse than the reference runway state, wherein the system is in electronic communication with and configured to control the brake device of the aircraft.

14. An aircraft comprising at least one pilot landing assist system comprising:

one or more processors and a non-transitory computer readable medium comprising executable instructions, wherein the executable instructions comprise:

a generation module configured to generate a reference braking datum depending on a reference runway state;

a determination module configured to determine local information depending on a local runway state characterizing an area of runway on which the aircraft is in movement during landing;

an update module configured to update the reference runway state when the local information indicates that a local runway state is worse than the reference runway state, the generation module being further configured to generate an updated braking datum depending on the updated runway state; and a brake assist module configured to receive the reference braking datum as input, followed by the updated datum, if applicable, further configured to generate a braking setpoint for controlling a brake device of the aircraft, wherein the local information comprises a local stopping distance estimated on the basis of local measurements made in the aircraft, and an obtaining module configured to obtain a reference stopping distance from the reference braking datum; and a comparator configured to compare a relative difference between the local stopping distance and the reference stopping distance with a predetermined threshold value, in order to determine whether or not the local runway state is worse than the reference runway state, wherein the pilot landing assist system is in electronic communication with and configured to control the brake device of the aircraft.

* * * * *